(12) United States Patent
Bevilacqua et al.

(10) Patent No.: US 11,979,470 B2
(45) Date of Patent: May 7, 2024

(54) DELIVERING NOTIFICATION INFORMATION

(71) Applicant: Comcast Cable Communications, LLC, Philadelphia, PA (US)

(72) Inventors: John G. Bevilacqua, Boulder, CO (US); Jorge Salinger, West Palm Beach, FL (US); Ty Pearman, Centennial, CO (US); Joseph Solomon, Geneva, IL (US); Saifur Rahman, Cinnaminson, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 501 days.

(21) Appl. No.: 15/057,806

(22) Filed: Mar. 1, 2016

(65) Prior Publication Data
US 2017/0257446 A1    Sep. 7, 2017

(51) Int. Cl.
*H04L 67/55*    (2022.01)
*H04H 20/59*    (2008.01)
(Continued)

(52) U.S. Cl.
CPC ............ *H04L 67/55* (2022.05); *H04H 20/59* (2013.01); *H04L 12/185* (2013.01); *H04L 12/1895* (2013.01); *H04L 12/66* (2013.01); *H04L 65/65* (2022.05); *H04L 67/02* (2013.01); *H04L 67/10* (2013.01); *H04L 67/563* (2022.05); *H04L 67/564* (2022.05); *H04N 21/44016* (2013.01); *H04N 21/814* (2013.01); *H04L 67/06* (2013.01)

(58) Field of Classification Search
CPC ....... H04L 67/26; H04L 67/06; H04L 12/185; H04L 12/66; H04L 65/4076; H04L 67/22; H04L 67/306; H04L 67/55; H04L 67/563; H04L 65/65; H04L 65/611; H04N 21/44016; H04N 21/812; H04N 21/814; H04H 20/59
USPC .......................................................... 709/206
See application file for complete search history.

(56) References Cited

U.S. PATENT DOCUMENTS

2011/0154382 A1* 6/2011 Chow ................ H04N 21/6405
                                                                 725/31
2012/0047542 A1* 2/2012 Lewis .................. H04N 21/812
                                                                 725/97
(Continued)

OTHER PUBLICATIONS

Alertus, "VoIP Phones & IP Speakers." <http://alertus.com/capabilities/voip>, 7 pages, retrieved May 31, 2016.

*Primary Examiner* — Emmanuel L Moise
*Assistant Examiner* — Xiang Yu
(74) *Attorney, Agent, or Firm* — Banner & Witcoff, Ltd.

(57) ABSTRACT

Methods and systems are disclosed for delivery of notification messaging in an IP network. A multicast gateway may receive manifest files and segments of programming content for retrieval by a client device. The multicast gateway may receive segments of a notification message and modify information in the manifest file to reference the notification message content. Upon retrieval of the manifest file by a client device, the client may access the notification message content referenced in the manifest file. The multicast gateway may replace references to programming content with references to notification message content having a corresponding content type.

24 Claims, 7 Drawing Sheets

(51) Int. Cl.
*H04L 12/18* (2006.01)
*H04L 12/66* (2006.01)
*H04L 65/65* (2022.01)
*H04L 67/02* (2022.01)
*H04L 67/06* (2022.01)
*H04L 67/10* (2022.01)
*H04L 67/563* (2022.01)
*H04L 67/564* (2022.01)
*H04N 21/44* (2011.01)
*H04N 21/81* (2011.01)

(56) References Cited

U.S. PATENT DOCUMENTS

| | | | |
|---|---|---|---|
| 2013/0074120 A1* | 3/2013 | Adimatyam | H04N 21/25841 |
| | | | 725/33 |
| 2013/0157609 A1* | 6/2013 | Vainik | H04W 4/90 |
| | | | 455/404.1 |
| 2014/0007158 A1* | 1/2014 | Bhagwat | G08B 27/005 |
| | | | 725/33 |
| 2014/0280750 A1* | 9/2014 | Panje | H04L 65/608 |
| | | | 709/219 |
| 2014/0282704 A1* | 9/2014 | Tumuluru | H04N 21/4882 |
| | | | 725/33 |
| 2015/0172342 A1* | 6/2015 | Yin | H04L 65/4084 |
| | | | 709/203 |
| 2016/0191585 A1* | 6/2016 | Ramamurthi | H04L 65/4084 |
| | | | 709/231 |
| 2016/0294909 A1* | 10/2016 | Killick | H04L 51/046 |
| 2018/0367637 A1* | 12/2018 | Balazinski | H04N 21/64322 |

* cited by examiner

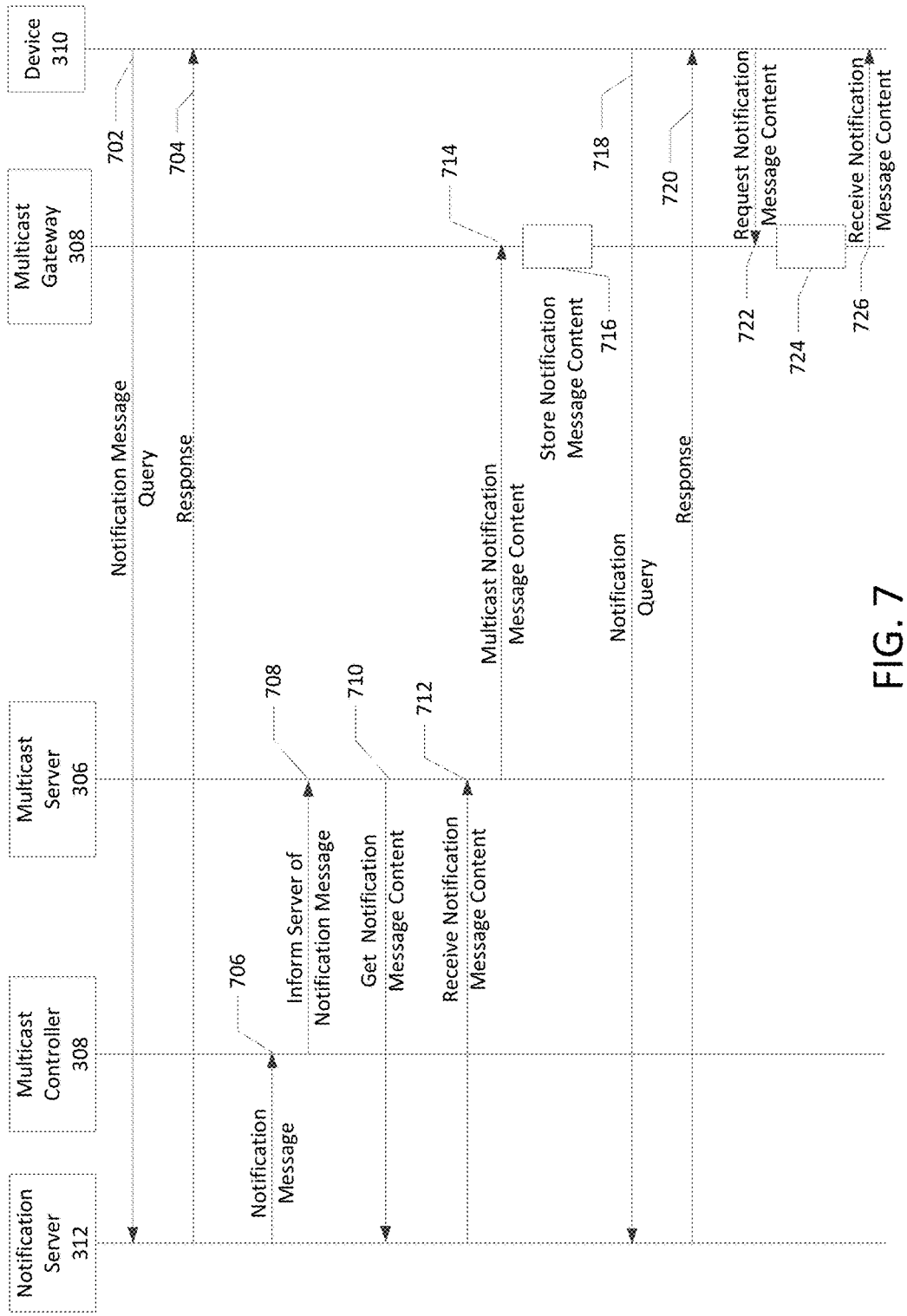

DELIVERING NOTIFICATION INFORMATION

BACKGROUND

In current information distribution networks, such as the Internet, notification messages, such as weather alerts and public safety messages, may be retrieved individually by each client device. In a typical implementation, an application, such as a web browser on a personal computer, may poll a notification message server to check for the availability of a notification message, for example, an emergency alert system (EAS) message. The application may poll the server periodically, in order to retrieve the notification message in a timely manner. When a notification message becomes available, the application may retrieve the notification message for presentation to a user. Some types of notification messages, such as emergency alert messages, are intended to be delivered to all available devices within a particular area, such as a county or city, for example. Therefore, once the notification message becomes available at the server, a large number of devices may attempt to download the message within a short time period. This may overload or otherwise cause congestion on the information distribution network, possibly preventing some devices from retrieving the notification message in a timely manner.

There is a need for an improved method for the distribution of these and other services.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In some aspects of the disclosure, a multicast gateway in an information distribution network may join a multicast group in order to receive notification messages. In some embodiments, the multicast gateway may modify a manifest file associated with programming content being provided to a client device, such as an IPTV device, to distribute notification message content. In an embodiment, the multicast gateway may replace information in the manifest file related to one or more segments of a program being served to the client, to cause the client to retrieve segments of the notification message content.

In aspects of the disclosure, a multicast gateway may receive notification message content via a first multicast group and receive program content via a second multicast group.

In some embodiments, one or more content segments may be replaced with notification or alert related segments, such as notification message audio or video content. In some embodiments, content segments may be replaced with notification content segments of the same or similar content type.

In some aspects of the disclosure, notification message content may be distributed via multicast to a multicast gateway. In some aspects, the multicast gateway may cache the notification message content and provide the notification message content from the cache in response to a request for the notification message content.

BRIEF DESCRIPTION OF THE DRAWINGS

Some features herein are illustrated by way of example, and not by way of limitation, in the accompanying drawings. In the drawings, like numerals reference similar elements between the drawings.

FIG. 7 illustrates another signaling and process flow for handling various aspects of notification message content distribution.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
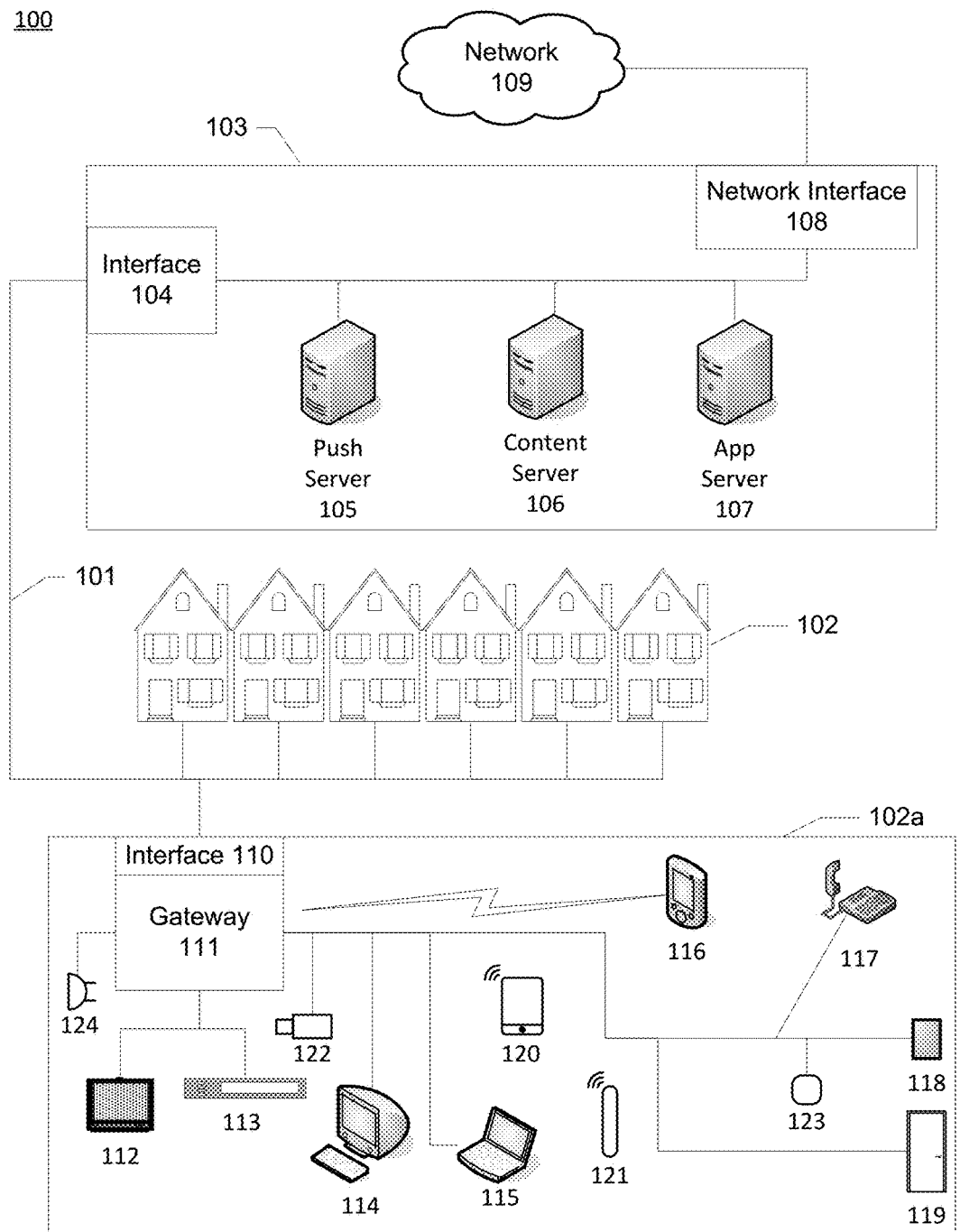
FIG. 1 illustrates an example information access and distribution network in accordance with one or more aspects as described herein.

FIG. 1 illustrates an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push server 105. The push server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user media habits and collecting that information for use in selecting advertisements. Another application server may be responsible for formatting and inserting advertisements in a video stream and/or content item being transmitted to the premises 102. It should be understood by those skilled in the art that the same application server may be responsible for one or more of the above listed responsibilities.

An example premises 102*a* may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia over Coax Alliance (MoCA) interfaces, Ethernet interfaces, universal serial bus (USB) interfaces, wireless interfaces (e.g., IEEE 802.11), Bluetooth interfaces, and others.

Figure 2:
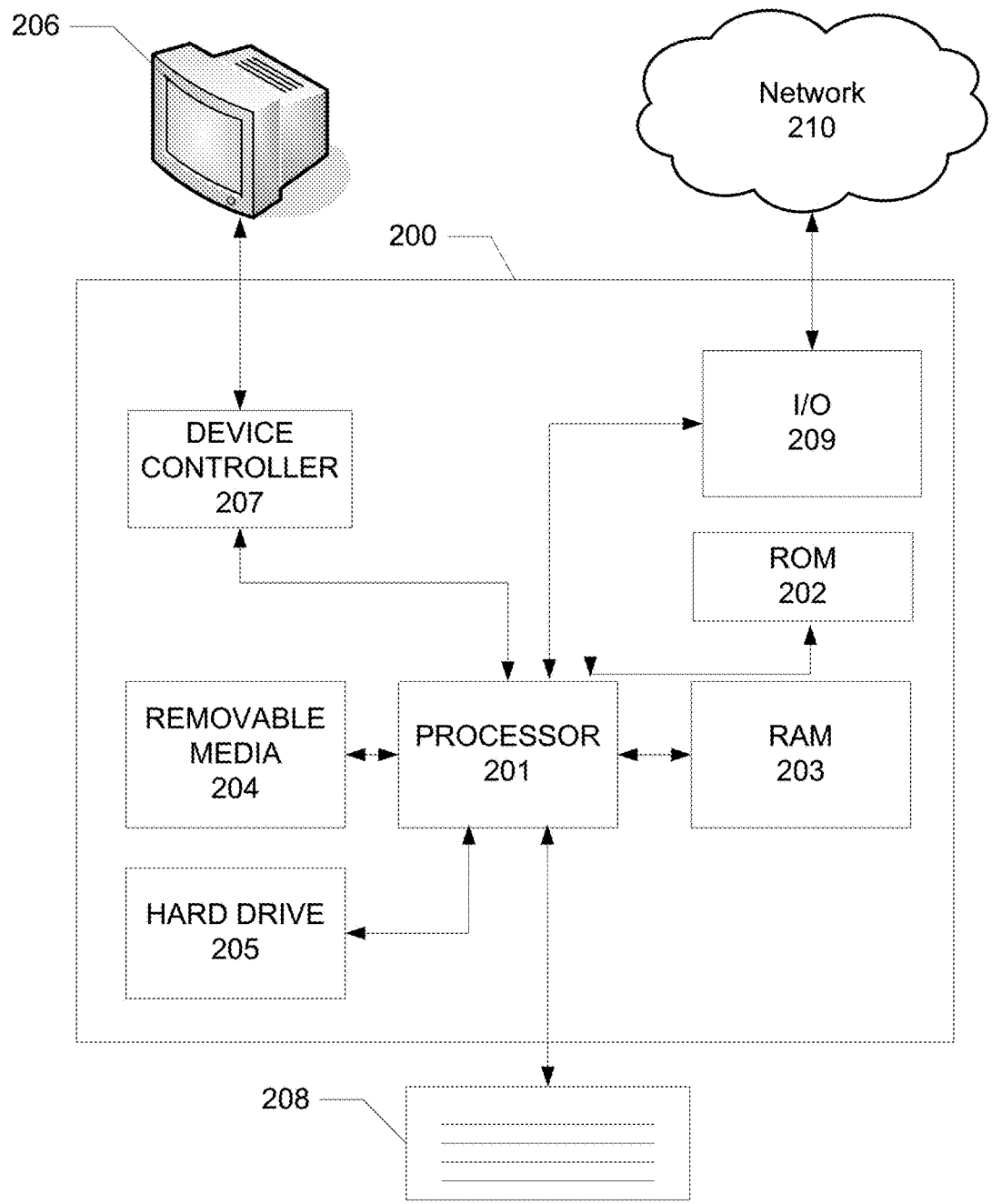
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor and/or audio processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
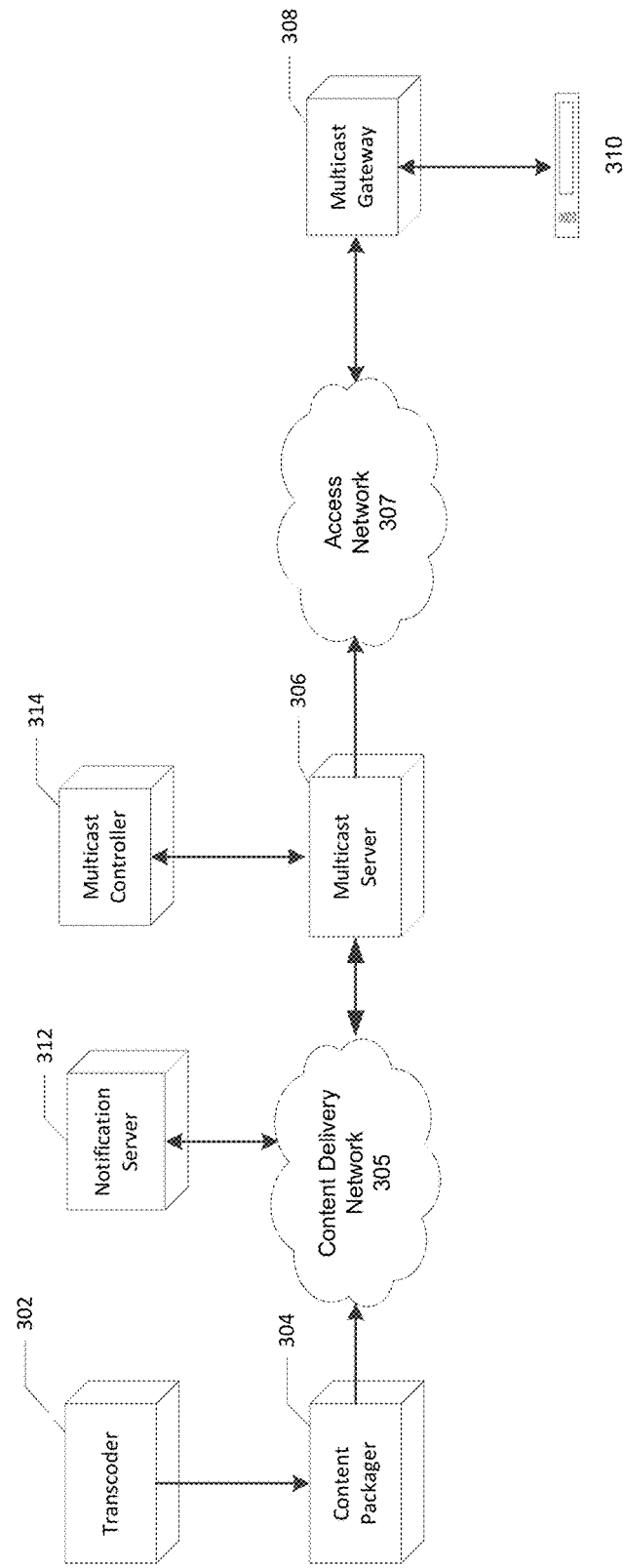
FIG. 3 illustrates an example network configuration in accordance with one or more aspects as described herein.

FIG. 3 illustrates an example network configuration 300 in accordance with one or more aspects as described herein. In some embodiments, content, such as program content, may be received at a transcoder 302, for example, by wired or wireless means. For example, channels, such as linear channels, may be received via one or more antennas, receivers or via a cable such as a coaxial cable. The transcoder 302 may be an adaptive bit rate (ABR) MPEG-4 transcoder, for example. In some embodiments, the transcoder 302 may transcode the channels into encoded streams of digital data according to the MPEG-4 standard. In some embodiments, the transcoder 302 may provide an encoding function, for example, when a channel is received as an analog channel. In some embodiments, the transcoder may provide multiple encoded streams for a particular channel. For example, the transcoder may output three streams of data for a particular channel, where each stream may have a different bit rate encoding. Continuing the example, the transcoder may output encoded streams having bit rates of 6250 kbps, 3480 kbps and 1663 kbps, for example. Those skilled in the art will realize that any number of streams may be output by the transcoder for a particular channel, and each stream may have any of a number of desired bit rate encodings.

In some embodiments, the bit rate used for encoding by the transcoder 302 may depend on the type of content or a quality of the content. In other examples, the bit rate may be selected based on the intended use of the resulting encoded content. For example, various bit rate encodings may be used to create streams of content appropriate for presentation on a range of devices, including the wireless devices 116 and televisions 112 of FIG. 1. A channel may include audio and video content. Audio and video content may be encoded at the same bit rate or they may be encoded at different bit rates.

One or more of the encoded streams output by the transcoder 302 may be provided to a content packager 304. In some embodiments, the content packager 304 may package one or more encodings of a transcoded channel according to the Dynamic Adaptive Streaming over HTTP (MPEG-DASH) specification. In other embodiments, the content packager 304 may package one or more encodings of a transcoded channel according to HTTP Live Streaming (HLS), HTTP dynamic streaming (HDS), Microsoft's Smooth Streaming, or other adaptive bitrate streaming protocol. In some embodiments, the content packager 304 may divide an encoded stream into segments of equal play time, for example, 2 second segments, and store each segment for retrieval by a client device. The number of bits in any segment may depend on the bit rate encoding used by the transcoder in creating the stream. For any channel, segments may be created of each bit rate encoded stream.

The content packager 304 may create a manifest file, also be referred to as a media presentation description (MPD) file, which may provide one or more URLs indicating access locations for the segments, including segments from each bit rate encoded stream. In some embodiments, a multicast sever 306 may perform content packaging.

The manifest file may be updated continuously by the content packager as the encoded streams are received by the content packager 304 and segments are created.

In some embodiments, the manifest file and segments may be stored by the content packager 304, either locally or at a remote device, such as at a server. The manifest file and segments may be transmitted via a content delivery network 305 to the multicast server 306 for storage and distribution to one or more multicast gateways 308. The manifest file and segments may be provided to the multicast server 306 in various ways, including multicast, unicast and via known file transfer protocols.

The multicast server 306 may distribute the manifest file and the segments, for example, via multicast on an access network 307 (which may correspond to links 101 of FIG. 1), to one or more multicast gateways 308. In some embodiments, the multicast server 306 may correspond to the content server 106 of FIG. 1.

The multicast gateway 308 may join one or more multicast groups in order to receive MPD files and content segments transmitted by the multicast server 306. Although one each of the multicast gateway and multicast server are depicted in FIG. 3, in various implementations one or more of the multicast gateway and the multicast server may be provided. For example, any multicast gateway 308 may receive manifest files and/or segments from more than one multicast server. In some embodiments, the multicast gateway 308 may join one or more multicast groups upon initialization. In other embodiments, the multicast gateway 308 may join one or more multicast groups in response to receiving a request for content from an external device, such as a device 310. In still other embodiments, the multicast gateway 308 may join one or more multicast groups upon receiving an instruction or command from one or more external devices, such as a user input devices (for example device 208 of FIG. 1) or a device located on the network 307. In some embodiments, one or more multicast gateways 308 may be positioned in each user premises 102a. For example, the multicast gateway 308 may correspond to the gateway 111 of FIG. 1. In various embodiments, the multicast gateway and may include audio/visual user interface capabilities (e.g. "headed") or may be provided without audio/visual interfaces (e.g. "headless").

One or more devices 310 may request content from the multicast gateway 308. In some embodiments, the device 310 may correspond to an IPTV player. In some embodiments, the device 310 may request content through the use of HTTP streaming, for example, by making requests conforming to the MPEG DASH specification. According to the MPEG-DASH specification, an MPEG-DASH content server may provide a list of available segment URLs in a Media Presentation Description (MPD) manifest file, requested by a DASH client. The DASH client may then request the segments using the URLs from the MPD file as needed in order to provide playback of the media content.

In some embodiments, the device 310 may request a manifest file for a particular channel, such as a linear channel. A linear channel may represent scheduled programming for a particular channel and may include live and/or recorded programs. For example, the device 310 may request the manifest file by using an HTTP GET request to request the manifest file by name as part of a uniform resource locator (URL). Since the manifest file for live channels may be updated continuously, the device 310 may fetch the manifest repeatedly, for example, at timed intervals, in order to retrieve an updated version in a timely manner. The timed interval may be based on the elapsed time since the previous fetch or the interval may be based on information contained within the manifest file itself, for example, a fetch frequency or an interval to the next fetch of the manifest file.

In some embodiments, the manifest file may contain segment information such as links (URLs) to segments of the content of the channel at various bit rate encodings. Once the device 310 has retrieved the manifest file, the URL for a particular content segment may be read from the manifest file. The device 310 may then request one or more of the content segments. Upon receipt of the content segment(s), the device 310 may provide the segments for presentation via a presentation device, such as the display 206 of FIG. 2.

In some embodiments, the multicast server 306 may retrieve notification system messages or other form of notification system content (such as audio or video, or combinations of any form of content) from a notification server 312. Notification system message content may include content of various notification messages, such as Emergency Action Notifications (EAN), local weather alerts, Child Abduction Emergency (CAE) alerts and other local, regional or national alert messages. The multicast server 306 may poll the notification server 312 to check for the presence of one or more notification messages. In some embodiments, the notification server 312 may transmit a notification message to the multicast server 306, without the multicast server polling for the message. In some embodiments, the notification server 312 may transmit an alert to indicate that a notification message is available and, in response, the multicast server 306 may retrieve the notification message from the notification server 312. In still other embodiments, the multicast server 306 may receive a command or instruction from a multicast controller 314, and in response retrieve the notification content. In various embodiments, the notification content may be stored for retrieval by various other servers or storage devices. In various embodiments, the term "notification message" may be used to describe a notification message and its contents.

After retrieval of the notification message, the multicast server 306 may multicast the notification message, or portions thereof, to one or more multicast gateways 308. In some embodiments, the multicast gateway 308 may join one or more multicast groups in order to receive notification system message content. In some embodiments, the multicast server 306 may multicast the notification message using a different multicast address than it uses for distributing non-notification content. In some embodiments, the multicast server 306 may multicast the notification message using one or more multicast addresses that are reserved for notification message content. In some embodiments, the multicast server 306 may multicast the notification message using one or more multicast addresses that it may use for distributing other types of content.

Upon receiving notification message content, the multicast gateway 308 may manipulate the content of a channel or program being delivered to the device 310. In some embodiments, the multicast gateway 308 may modify a manifest file of a channel, creating a modified manifest file, by replacing a reference to a content item of the channel or program with a reference to content of the notification message. For example, the multicast gateway 308 may be streaming content, such as live programming, to the device 310. The content may include a manifest file and various content segments, for example, according to the MPEG-DASH standard. Upon receiving the notification message content, the multicast gateway 308 may be in progress delivering the live programming. The multicast gateway 308 may modify the manifest file of the live programming to reference a segment of the notification message content, replacing a reference to a portion of the live programming. Therefore, when the device 310 retrieves the manifest file for the live programming, one or more references to the notification message content may be contained in the manifest file. Upon processing the modified manifest file, the device 310 may fetch one or more segments of notification message content and provide the segments to a presentation device, where the segments may be presented to a user. In some embodiments, the multicast gateway 308 may cache the notification message content in cache memory for later retrieval by the device 310.

In some embodiments, the multicast gateway 308 may replace similar types of content in the manifest file with notification message content while leaving other types of content unmodified. For example, the multicast gateway 308 may be streaming a program, which may include video and audio, to the device 310. After receiving a notification message containing audio content, the multicast gateway 308 may modify the manifest file of the program so that references to audio segments of the program are replaced with references to the audio content of the notification message. In such an embodiment, the device 310 may then retrieve video segments of the program and audio segments of the notification message content. When presented to a viewer, the video content of the program would be visible while the audio of the notification message is sounded. References to content of other types (video, text, for example) may be similarly replaced by references to similarly typed content of the notification message, if such content is available as part of the notification message. In some embodiments, references to segments at one or more bit rate encodings may be replaced with references to notification message content.

In some embodiments, the notification message may include a content type that is not part of a program in progress, for example, a notification message may include text content while the program in progress may consist of audio and video content. In these embodiments, the multicast gateway 308 may add the content type to the manifest file of the program. Continuing the example, references to the notification message textual content may be added to the manifest file for the program.

There are various ways in which the multicast gateway 308 may determine a content type. In some embodiments, the content type may be determined from information contained in the manifest file. For example, information for one or more segments may be preceded by <ContentComponent contentType="video" id="1"/>, indicating that the segments following are video. In another example, information for one or more segments may be preceded by <ContentComponent contentType="audio" id="2"/>, indicating that the segments following are audio. The content type of notification message content may be indicated in a similar manner, for example, by the inclusion of XML, markup describing the content type.

In some embodiments, segment files containing the notification message content may be stored by the multicast gateway 308, replacing previously stored media content segment files. For example, a media content file may have been stored by the multicast gateway 308 with the file name media_segment1. A segment file of the notification message content may be stored using the same file name, replacing the segment file of the media content. This allows the manifest file to remain unchanged while still delivering the notification message content to any client requesting the manifest file.

In some embodiments, the multicast gateway 308 may respond to a request for the manifest file by providing a URL redirection (URL forwarding) response indicating the location of a manifest file associated with notification message content. For example, the URL redirection may cause the device 310 to issue a subsequent request to obtain the manifest file from the URL in the redirection message. When presented to a user of the device 310, the effect may be similar to a forced channel tune, as may be seen in legacy EAS broadcast systems.

In some embodiments, the multicast gateway 308 may substitute the manifest requested by the device 310 with a manifest of the notification message content. For example, if the device 310 requests a manifest file corresponding to a program while a notification message has been received at the multicast gateway 308, the multicast gateway may respond to the request by providing a manifest file corresponding to the notification message content. In some embodiments, subsequent to expiry of the notification message, the multicast gateway may resume delivery of the manifest file corresponding to the program.

In some embodiments, the multicast controller 314 may determine an area corresponding to a region in which a notification message should be distributed. For example, it may be determined that the notification message has been targeted to a particular city or county. In some embodiments, this information may be provided by the notification server 312. If it is determined that the location of the multicast gateway 308 is within the area for distribution of the notification message, the multicast controller 314 may cause the multicast server 306 to multicast the notification message content and the multicast gateway may modify the manifest file as disclosed herein to provide the notification message content. If it is determined that the location of the multicast gateway 308 is not within the area for distribution of the notification message, the multicast gateway may provide the manifest file without modification.

In some embodiments, the multicast controller 314 may determine that a zip code corresponding to the device 310 or the multicast gateway 308 is located within, or overlapping, the county or city information of the notification message and provide the notification message content to the device 310.

In some embodiments, the multicast controller 314 may provide information to the multicast server 306 so that it may retrieve the notification message content that is appropriate for the locations of the multicast gateways 308. The multicast controller 314 may be notified of the availability of notification message content via an event or other message, for example transmitted by the notification server.

In some embodiments, the multicast gateway 308 may determine a time period in which the notification message content should be provided and the manifest file may be modified in response to determining time period. For example, notification message content may be valid for delivery for a particular time span, such as thirty minutes from the time it was received by the multicast gateway. As an example, a weather-related notification would not be useful if received a day after a storm has passed.

In some embodiments, the multicast gateway 308 may modify the manifest file in response to determining a priority of the notification message. For example, in some embodiments the notification messages may include information indicating a level of importance of the notification message. In various embodiments, the multicast gateway 308 may provide the notification message content at a later time so as not to interrupt or disturb a viewer of a program until the program has ended.

The methods as disclosed herein may also be applied to video on demand (VOD) programming. With VOD programming, the manifest file may not be periodically updated as it is in the case for linear programming. Segments of VOD content may be created and stored for later retrieval. The manifest file may be created at the time that the VOD content is stored. In some embodiments, multicast gateway 308 may use any of the methods as disclosed herein to cause the replacement of a segment of VOD programming with a segment of notification message content. In some embodiments, the multicast gateway 308 may pause the delivery of VOD programming so that the notification message content may be provided, without causing a viewer to miss segments of the VOD programming.

In some embodiments, the multicast gateway 308 and/or the device 310 may poll the notification server 312 periodically to check for the availability of a notification message. For example, the device 310 may poll the notification server 312 every 15 seconds to check for the availability of a notification message. If, in response, the device 310 is informed that a notification message is available, the device 310 may retrieve the message from a location in the network configuration depicted in FIG. 3, such as from the notification server 312.

In some embodiments, the notification message may be provided to a component in the network path between the device 310 and the notification server 312 for caching and later delivery to a requesting device, such as the device 310. For example, the notification message may be provided to the multicast gateway or to the multicast server, as described above. In some embodiments, the notification message may be multicast by the multicast server 306 through the network 305 and may be received by the multicast gateway 308, which may be configured to receive messages on a particular multicast address used for distribution of notification messages.

In some embodiments, polling or retrieval requests from the device 310 may be intercepted by a component in the network path and the request may then be serviced by a transparent cache of that component, so that the request need not be sent onwards through the network, for example to the notification server. Continuing the example, the notification message may be received and cached by the multicast gateway 308, which may serve as a transparent cache. When the device 310 makes a request to the notification server, the multicast gateway may provide the requested notification message to the device. As would be known by those skilled in the art, a transparent cache may enable delivery of requested content stored in the cache of a network component without requiring change or reconfiguration to the requesting device. For example, the device 310 may send the request into the network directed to the notification server, but the request may be intercepted and the response provided by another network component, such as by the multicast gateway 308.

In some embodiments, providing the notification message for storage by the transparent cache of a component in the network may enable the notification message to be served from a location closer to the requesting device, thereby saving the request message (and the resulting response) from being sent across the network, thereby reducing traffic on the network and providing faster delivery.

In some embodiments, other types of content may be provided by use of the transparent cache in a network component, such as the multicast gateway 308. For example, advertisements may be distributed to the multicast gateway 308 and cached for later serving to the device 310 upon request by the device for the advertisement. In other embodiments, software updates may be distributed for storage in a transparent cache as described above and provided to requesting devices.

In some embodiments, a transparent cache may be pre-loaded with content or a network component hosting the transparent cache may otherwise retrieve content, such as notification message content, advertisements or software updates, among others, for later delivery to other network components. For example, the multicast server 306 may be notified of the availability of a notification message and may retrieve the notification message from the notification server 312. In other embodiments, the multicast server may poll for the availability of a notification message. In various embodiments, the notification server, or other component related to a notification system, may provide notice to various network components, such as the multicast controller 315, the multicast gateway 308 or the multicast server 306 of the availability of a notification message. In response, the various network components may retrieve and store the notification message in local storage, such as in a cache, for use in providing to devices upon request.

In some other embodiments, a manifest file may be provided to the device 310 having instructions that cause the device 310 to request the notification message content, for example from the notification server 312. For example, the device 310 may be retrieving linear programming content via a manifest file from the multicast gateway 308 and may receive an instruction or link in the manifest file which causes the device 310 to retrieve the notification message content. As described above, upon receiving the request for the notification message content, the multicast server may provide the notification message content from the transparent cache of the multicast gateway. The instruction or link of the above example may be placed into the manifest file by the multicast gateway or it may be placed in to the manifest file by another network component, for example, by the multicast server or other component.

Figure 4:
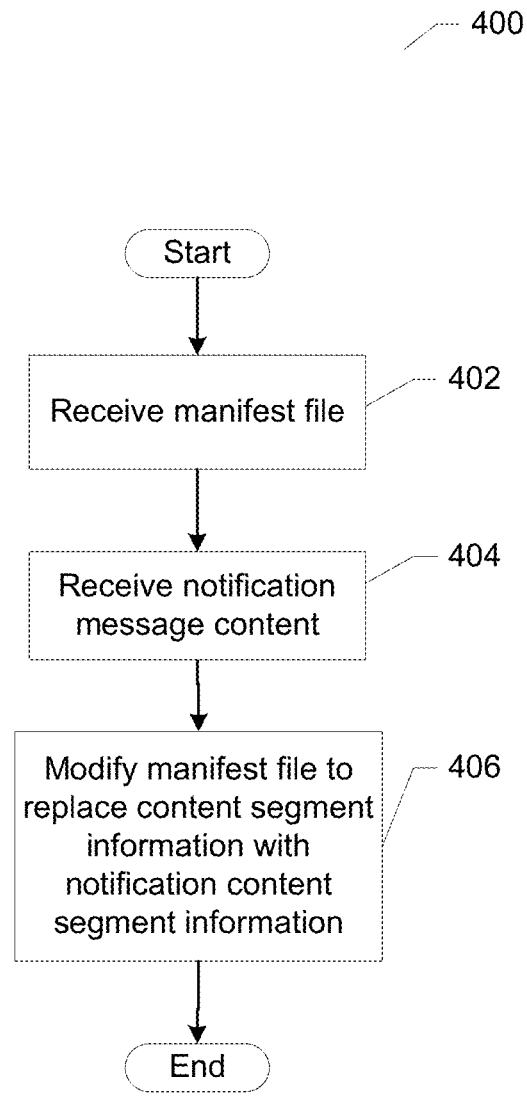
FIG. 4 illustrates an example method performed in accordance with one or more aspects as described herein.

FIG. 4 is an exemplary flow diagram illustrating an example method 400 in accordance with one or more disclosed features described herein. In one or more embodiments, the method illustrated in FIG. 4 and/or one or more steps thereof may be performed by one or more computing devices (e.g., multicast gateway 308, gateway interface device 111, set-top box 113, interface 110, and the like). In other embodiments, the method illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 402, a manifest file may be received, for example, by the multicast gateway 308. In some embodiments, the manifest file may represent access information associated with segments for a particular media program. In some embodiments, the media program may be content for a particular channel, such as a linear channel. In some embodiments, the manifest file may be received via a multicast group.

At step 404, the multicast gateway may receive notification message content. In some embodiments, the notification content may be received via a multicast group, which may be the same or different from the multicast group via which the manifest file was received in step 402. The notification message content may be composed of one or more content types, for example, the notification message content may be audio and/or a text.

At step 406, the manifest file may be modified to replace segment information, such as a URL reference to the segment. As described above, in some embodiments, program segment information may be replaced with notification message content segment information of the same or of a similar content type. The modified manifest file may be retrieved by the device 310 when it next requests the manifest file of the media program, thereby providing the device 310 with the segment information for retrieval of the notification message content. It can be appreciated that the operation of the device 310 may need no modification in order to support retrieval of notification message content. From the perspective of the device 310, it continues to retrieve manifest files and content of a media program. As disclosed herein, segments of the media program may be replaced with segments of notification message content, thereby causing the device 310 to present notification message content along with, or instead of, media program content.

Figure 5:
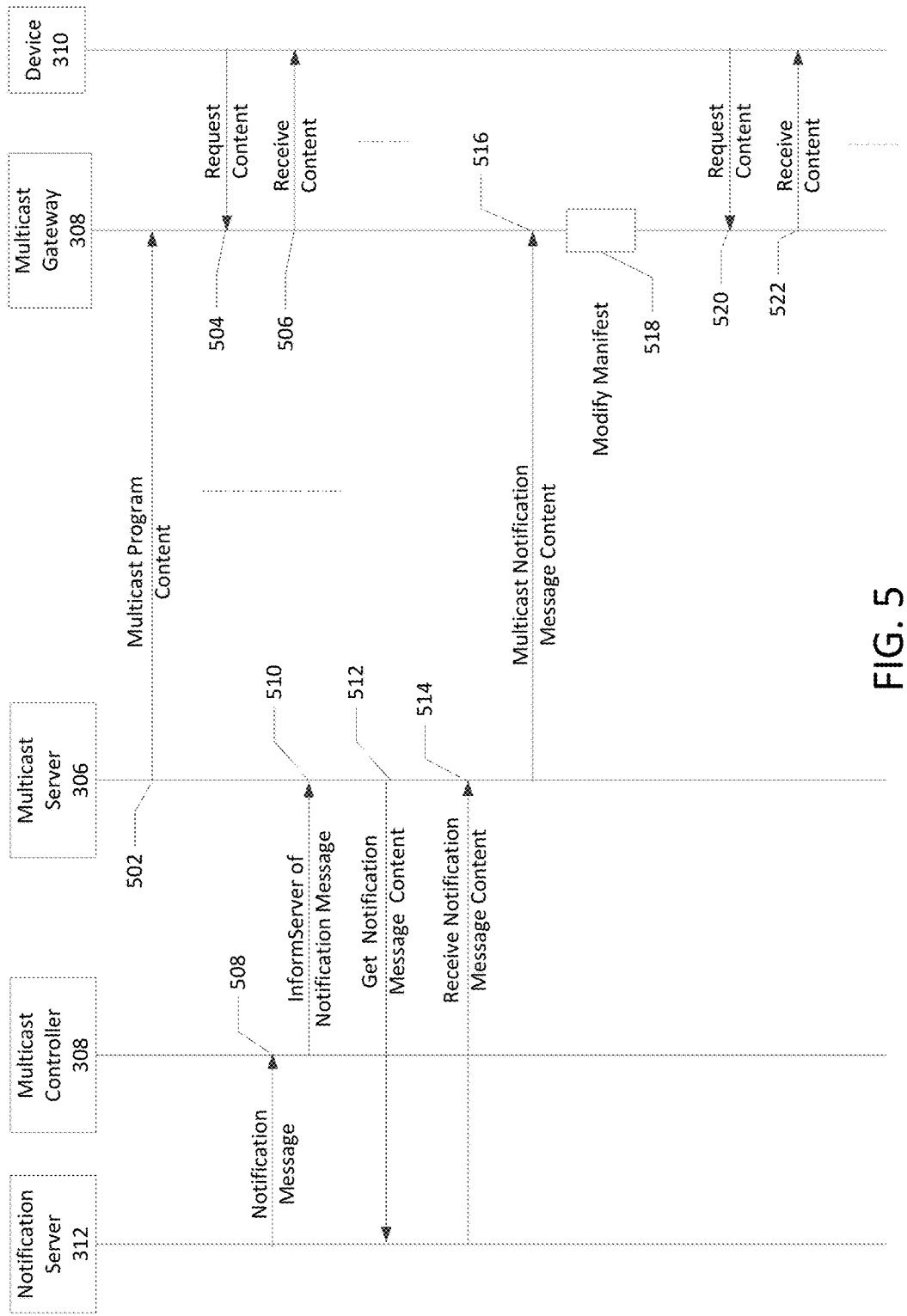
FIG. 5 illustrates a signaling and process flow for handling various aspects of notification message content distribution.

FIG. 5 illustrates an example of notification message content delivery, as described herein. In step 502, the multicast server 306 may transmit (and may continuously do so) one or more multicast feeds of program content, for example, content of a linear channel. These multicast feeds may contain items of content that have been provided by the packager 304, as discussed above. For example, the multicast feed may provide manifest files, manifest file updates and segments of content. The multicast server may transmit the multicast feeds in response to various commands, configuration settings or instructions. The multicast feeds may be received by the multicast gateway 308.

In step 504, the device 310 may request content, such as content of a linear channel. For example, the content requested may correspond to one of the multicast streams being received by the multicast gateway. Although the steps 504 and 506 refer to content in general, it should be understood that the content request may represent a request for a manifest file and/or one or more segments of content. The device 310 may request content periodically (e.g., every 10 seconds, etc.), in order to retrieve content, such as live content, in a timely manner. The device may make requests, such as depicted in step 504 periodically as long as a viewer continues to watch or otherwise consume a particular program.

At step 508, a notification message may be provided to the multicast controller 308 by the notification server 312. In various embodiments, the notification message may be provided to other components in addition to or instead of to the multicast controller. In some embodiments, the one or more components in the network may poll the notification server for the notification message.

At step 510, the multicast controller 308 may inform the multicast server 306 that a notification message is available for retrieval. At steps 512 and 514, the multicast server 306 may get and receive the notification message content. The notification message content may correspond to audio, video or text contents of the notification message.

At step 516, the multicast server 306 may transmit one or more multicast feeds of the notification message content. The multicast server 306 may transmit the notification message content on the same multicast feed as used for the program content or via a different multicast feed, for example, via a multicast feed reserved for notification message content.

In some embodiments, at step 518, the multicast gateway 308 may modify a manifest file of the program content received in step 502. For example, the multicast gateway 308 may replace segment information related to program content with segment information related to notification message content.

In some embodiments, any of steps 508-518 may depend on a target area associated with the notification message. For example, the multicast controller 308 may, after receiving the notification message in step 508, determine that the notification message content is not targeted to a geographical area served by the multicast server 306 and therefore the multicast controller 308 may not inform the multicast server 306 of the availability of the notification message content.

In step 520, the device 310 may request content. As discussed above, the device 310 may periodically request manifest files in order to retrieve content in a timely manner. Since the manifest file may have been modified in the previous step, the device 310 may in step 522 retrieve the modified manifest file in which segment information related to notification message content is provided. Subsequent requests by the device for the segments referred to in the modified manifest file will provide the device 310 with the notification message content and the device 310 may provide the notification message content to a presentation device, for example, for viewing by a user.

Figure 6:
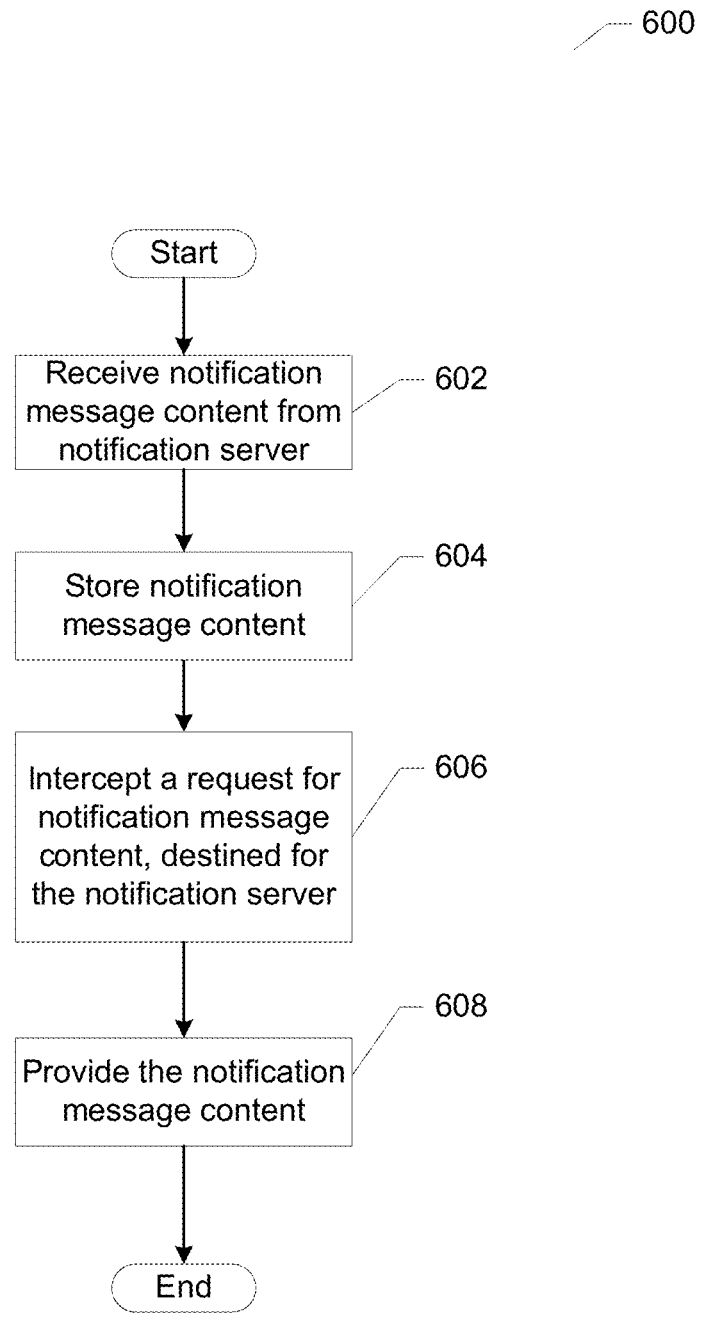
FIG. 6 illustrates another example method performed in accordance with one or more aspects as described herein.

FIG. 6 is an exemplary flow diagram illustrating another example method 600 in accordance with one or more disclosed features described herein. In one or more embodiments, the method illustrated in FIG. 6 and/or one or more steps thereof may be performed by one or more computing devices (e.g., multicast gateway 308, gateway interface device 111, set-top box 113, interface 110, and the like). In other embodiments, the method illustrated in FIG. 6 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 602, notification message content may be received, for example, by the multicast gateway 308. The notification message content may be composed of one or more content types, for example, the notification message content may be audio and/or a text. In some embodiments, the notification message content may be received via a multicast group via a transmission from the multicast server 306 or from the notification server 312, for example.

At step 604, the notification message content may be stored. For example, the notification message content may be stored in cache memory of the multicast gateway 308.

At step 606, a request for the notification message content may be intercepted. For example, the request may be received by the multicast gateway 308 from the device 310. In some embodiments, the request may contain addressing information that indicates that the request should be forwarded to the notification server 312 for handling. However, in step 606, the request may be intercepted, meaning that it need not be sent onwards to the notification server. Continuing to step 608, the request may be handled. For example, when the request is for notification message content that is currently cached in memory, the notification message content may be provided in response to the request.

FIG. 7 illustrates another example of notification message content delivery, as described herein. In step 702, the device 310 may query the notification server 312 to check for the availability of a notification message. In some embodiments, the device 310 may periodically check for the availability of notification messages, for example, every 15 seconds.

In step 704, the notification server 312 may send a response to the query. In the example shown in step 704, the notification server 312 may inform the device 310 that no notification message is currently available.

At step 706, a notification message may be provided to the multicast controller 308 by the notification server 312. In various embodiments, the notification message may be provided to other components in addition to or instead of to the multicast controller. In some embodiments, the notification message may inform the multicast controller 308 of the availability of the notification message content.

At step 708, the multicast controller 308 may inform the multicast server 306 that a notification message is available for retrieval. At steps 710 and 712, the multicast server 306 may request and receive the notification message content. The notification message content may correspond to audio, video or text contents of the notification message.

At step 714, the multicast server 306 may transmit one or more multicast transmissions of the notification message content. In some embodiments, the multicast server 306 may transmit the notification message content via a multicast address reserved for notification message content.

In some embodiments, at step 716, the multicast gateway 308 may receive the notification message content, for example by monitoring a particular multicast address for notification message content, and store the notification message content. In some embodiments, the notification message content may be stored in cache memory of the multicast gateway 308.

At step 718, the device 310 may again query the notification server 312 to check for the availability of a notification message.

At step 720, the notification server 312 may send a response to the query. In the example shown in step 720, the notification server 312 may inform the device 310 that a notification message is currently available for retrieval.

At step 722, the device 310 may attempt to retrieve the notification message content by sending a request directed to the notification server.

At step 724, the multicast gateway 308 may intercept the request from the device 310 and determine whether the requested notification message content is already available in cache memory. In some embodiments, the multicast gateway may locate a message ID contained in the request from the device and may use the message ID to find the corresponding message content in the cache memory. In other embodiments, information from one or more portions of a request URL provided by the device 310 may be used to locate the requested notification message content stored in cache memory. If the requested notification message content is not located in cache memory of the multicast gateway, the request may be forwarded on for handling by the notification server.

At step 726, the multicast gateway may send a response to the device 310 containing the notification message content.

In some embodiments, any of steps 706-726 may depend on a target area associated with the notification message. For example, the multicast controller 308 may, after receiving the notification message in step 706, may determine that the notification message content is not targeted to a geographical area served by the multicast server 306 and therefore the multicast controller 308 may not inform the multicast server 306 of the availability of the notification message content.

As will be recognized by those skilled in the art, the methods described herein allow several improvements to existing networks supporting distribution of notification message content. In some embodiments, various other services may be provided according to the methods as described herein. For example, software updates, channel lineup files and advertisements, among other things, may be distributed to the devices 310 in a bandwidth efficient manner using the methods as described above.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
receiving, by a gateway and from a server, a manifest file, wherein the manifest file comprises segment information for a plurality of segments of a first media item;
receiving, by the gateway and from the server, based on an instruction from a multicast controller remote from the gateway, a notification message comprising emergency alert content;
receiving, by the gateway, a request sent from a user device to the server and requesting emergency alert content;
modifying, by the gateway, based on the received request and on output by the user device of the first media item and further based on determining that a time period associated with the notification message has not expired, the manifest file by replacing a portion of the segment information with segment information corresponding to at least a portion of the notification message; and
outputting, by the gateway and based on the notification message, the modified manifest file.

2. The method of claim 1, further comprising:
joining a multicast group prior to receiving the notification message, wherein the receiving the notification message comprises receiving the notification message via the multicast group.

3. The method of claim 1, further comprising:
joining a multicast group during initialization of the gateway, wherein the notification message is received via the multicast group.

4. The method of claim 1, further comprising:
joining a multicast group after receiving a command to join the multicast group and before receiving the notification message.

5. The method of claim 1, wherein the receiving the manifest file comprises receiving the manifest file via a first multicast group and wherein the receiving the notification message comprises receiving the notification message via a second multicast group.

6. The method of claim 1, wherein the modifying the manifest file is performed based on a priority of the notification message.

7. The method of claim 1, further comprising:
determining, by the gateway and based on a determination that a content type of the notification message is audio, a segment, of the plurality of segments of the first media item, wherein a content type of the determined segment comprises audio.

8. The method of claim 1, wherein one of the plurality of segments comprises first content and second content, and wherein a first content type of the first content is the same as a content type of the notification message and is different from a second content type of the second content.

9. The method of claim 1, wherein the receiving the request comprises:
intercepting, by the gateway and from the user device, the request.

10. The method of claim 1, wherein the gateway comprises a multicast gateway.

11. The method of claim 1, wherein the instruction from the multicast controller directs provision of the emergency alert content based on a location of the gateway within a geographical area corresponding to the emergency alert content.

12. The method of claim 1, wherein outputting the modified manifest file causes:
pausing, by the user device and at a portion of the first media item, output of the first media item based on output of the at least a portion of the notification message; and
resuming, at the portion of the first media item, output of the first media item after outputting the at least a portion of the notification message.

13. The method of claim 1, wherein the manifest file further comprises an instruction to receive the notification message and wherein the receiving the notification message is based on the instruction.

14. A method comprising:
intercepting, by a gateway and from a user device, a request to retrieve, from a server, emergency alert content;
determining, by the gateway and based on the request, whether emergency alert content has been received by the gateway;
based on the determining comprising a determination that first emergency alert content has not been received by the gateway, sending, by the gateway, the request to the server;
receiving, based on the gateway sending the request to the server and based on an instruction from a multicast controller remote from the gateway, the first emergency alert content from the server; and
causing, based on determining that a time period associated with the first emergency alert content has not expired, the user device to output the first emergency alert content.

15. The method of claim 14, further comprising:
joining a multicast group; and
receiving, via the multicast group, the first emergency alert content.

16. The method of claim 14, further comprising:
receiving, via a first multicast group, the first emergency alert content; and
receiving, via a second multicast group, a second manifest file.

17. The method of claim 14, wherein the causing comprises sending a redirect response, and wherein the redirect response comprises a URL of a location of a manifest file comprising a reference to the first emergency alert content.

18. The method of claim 14, further comprising:
determining a location of the gateway, wherein the causing comprises sending, based on the location, a manifest file comprising a reference to the first emergency alert content.

19. The method of claim 14, wherein the request comprises address information of the server.

20. A method comprising:
receiving, by a computing device, a first manifest file, wherein the first manifest file comprises a plurality of identifiers identifying segments of a media item;
receiving a notification message;
intercepting, by the computing device and from a user device, a request to retrieve, from a server, the notification message;
generating, based on the request and based on determining that a time period associated with the notification message has not expired, a second manifest file, wherein the second manifest file comprises:
at least one identifier of the plurality of identifiers; and
segment information corresponding to a modified segment of the media item, wherein the segment information indicates:
at least one portion of the notification message, and
at least one portion of the media item; and
outputting the second manifest file.

21. The method of claim 20, wherein at least one of the segments of the media item has a content type corresponding to a content type of the notification message.

22. The method of claim 20, further comprising:
joining a multicast group prior to receiving the notification message, wherein the receiving the notification message comprises receiving the notification message via the multicast group.

23. The method of claim 20, wherein the receiving the first manifest file comprises receiving the first manifest file via a first multicast group and wherein the receiving the notification message comprises receiving the notification message via a second multicast group.

24. The method of claim 20, wherein the receiving the notification message comprises receiving the notification message based on an instruction from a multicast controller.

* * * * *

UNITED STATES PATENT AND TRADEMARK OFFICE
CERTIFICATE OF CORRECTION

Page 1 of 1

PATENT NO. : 11,979,470 B2
APPLICATION NO. : 15/057806
DATED : May 7, 2024
INVENTOR(S) : Bevilacqua et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this
Third Day of December, 2024

Katherine Kelly Vidal
*Director of the United States Patent and Trademark Office*